(12) United States Patent
Steegmaier et al.

(10) Patent No.: US 12,483,080 B2
(45) Date of Patent: Nov. 25, 2025

(54) ROTOR RIM FOR AN ELECTRIC MACHINE

(71) Applicant: Voith Patent GmbH, Heidenheim (DE)

(72) Inventors: Jonas Steegmaier, Lonsee (DE); Daniel Ludwig, Herbrechtingen (DE)

(73) Assignee: Voith Patent GmbH, Heidenheim (DE)

( * ) Notice: Subject to any disclaimer, the term of this patent is extended or adjusted under 35 U.S.C. 154(b) by 247 days.

(21) Appl. No.: 18/334,656

(22) Filed: Jun. 14, 2023

(65) Prior Publication Data

US 2023/0336042 A1    Oct. 19, 2023

Related U.S. Application Data

(63) Continuation of application No. PCT/EP2021/076946, filed on Sep. 30, 2021.

(30) Foreign Application Priority Data

Dec. 14, 2020    (DE) .................... 10 2020 133 287.4

(51) Int. Cl.
- H02K 1/28    (2006.01)
- H02K 1/32    (2006.01)
- H02K 7/102   (2006.01)

(52) U.S. Cl.
CPC .............. H02K 1/28 (2013.01); H02K 1/325 (2013.01); H02K 7/102 (2013.01)

(58) Field of Classification Search
CPC .......... H02K 1/28; H02K 1/325; H02K 7/102; H02K 1/24; H02K 1/32; H02K 1/22
See application file for complete search history.

(56) References Cited

U.S. PATENT DOCUMENTS

| | | | |
|---|---|---|---|
| 7,919,898 B2 * | 4/2011 | Wang | H02K 1/276 310/216.127 |
| 2015/0222151 A1 * | 8/2015 | Semken | H02K 1/28 29/452 |

FOREIGN PATENT DOCUMENTS

| | | |
|---|---|---|
| CH | 479 976 | 6/1996 |
| CN | 101752917 A | 6/2010 |

(Continued)

OTHER PUBLICATIONS

Notification of the Transmission of the International Search Report and Written Opinion of the International Search Authority or Declaration dated Jan. 4, 2022 for International Application No. PCT/EP2021/076946 (13 pages).

(Continued)

*Primary Examiner* — Thomas Truong
(74) *Attorney, Agent, or Firm* — TAYLOR & EDELSTEIN, PC

(57) ABSTRACT

A rotor rim for an electric machine, having at least two solid annular plates and axially oriented tension bolts connecting the annular plates with each other, wherein on the outer circumference of annular plates grooves are arranged for accommodating rotor poles, for each rotor pole at least two tension bolts are provided, between each two adjacent annular plates a layer of intermediate ring elements is arranged, each layer includes exactly one intermediate ring element per rotor pole, intermediate ring elements are arranged such that between each two adjacent intermediate ring elements a ventilation duct is formed which extends from the inside of the rotor rim to the outer circumference of the rotor rim where it opens into space between the rotor poles, and each intermediate ring element is penetrated by at least two tension bolts and only abuts with a part of its axially oriented surface against adjacent annular plates.

7 Claims, 9 Drawing Sheets

(56) References Cited

FOREIGN PATENT DOCUMENTS

| | | |
|---|---|---|
| CN | 106787596 A | 5/2017 |
| CN | 109921526 A | 6/2019 |
| DE | 690 13 810 T2 | 3/1995 |
| DE | 195 15 260 A1 | 10/1996 |
| EP | 2 639 937 A1 | 9/2013 |
| JP | 51-54204 | 5/1976 |
| JP | 2013-236499 A | 11/2013 |

OTHER PUBLICATIONS

Machine translation of JPS 51-54204 downloaded from espacenet (3 page).

* cited by examiner

ROTOR RIM FOR AN ELECTRIC MACHINE

CROSS REFERENCE TO RELATED APPLICATIONS

This is a continuation of PCT application no. PCT/EP2021/076946, entitled "ROTOR RIM FOR AN ELECTRIC VEHICLE", filed Sep. 30, 2021, which is incorporated herein by reference. PCT application no. PCT/EP2021/076946 claims priority to German patent application no. 10 2020 133 287.4, filed Dec. 14, 2020, which is incorporated herein by reference.

BACKGROUND OF THE INVENTION

1. Field of the Invention

The invention relates to a rotor for a rotating electric machine, wherein the rotor is designed as a salient-pole rotor. The electric machine may be a generator, a motor or motor-generator.

2. Description of the Related Art

Salient pole rotors are generally constructed of solid steel and have distinct pole shoes on which the excitation winding is located. On larger machines, the pole shoes are usually attached to a solid hub by way of one or more hammerhead-like grooves.

For large machines, an arrangement has also become known in which the rotor consists of a rotor rim and a support structure, the rotor rim being connected to the shaft by way of the support structure. Such an arrangement is disclosed in CN 101752917 B. The rotor rim is made up of several annular plates stacked on top of each other. Support blocks (No. 8 in the drawings) and ventilation guide plates (No. 7 in the drawings) are arranged between the annular plates.

Another such arrangement is disclosed in CN 109921526 B, wherein the ventilation guide plates are designed as a two-part component (No. 9 and 10 in FIG. 1), and wherein one part of each ventilation guide plate is connected to the adjacent annular plates by welding. Polygonal grooves (No. 13 in FIG. 3) and protrusions (No. 14 in FIG. 3) in the adjacent annular plates serve to align the ventilation guide plates.

What is needed in the art is an alternative embodiment of a rotor rim for an electric machine.

SUMMARY OF THE INVENTION

The present invention provides a rotor rim for an electric machine, including at least two solid annular plates, wherein two of the annular plates are arranged in axial direction on the outside and any given number of annular plates are arranged between outer annular plates and having a plurality of axially oriented tension bolts which connect annular plates to one another, wherein on the outer circumference of annular plates grooves are arranged for accommodating a number of rotor poles, and wherein for each rotor pole at least two tension bolts are provided, and wherein between each two adjacent annular plates respectively a layer of intermediate ring elements is arranged, wherein each layer includes exactly one intermediate ring element per rotor pole, and wherein intermediate ring elements are arranged in such a way that between each two adjacent intermediate ring elements a ventilation duct is formed which extends from the inside of the rotor rim to the outer circumference of the rotor rim where it opens into the space between the rotor poles, characterized in that, each intermediate ring element is penetrated by at least two tension bolts and only abuts with a part of its axially oriented surface against respectively adjacent annular plates, wherein abutting part of the axially oriented surface is designed in each case to be raised with respect to the remaining part of the axially oriented surface of same intermediate ring element.

Further, optionally, at least a part of the annular plates has ventilation holes which extend from the interior of the rotor rim to the outer circumference of the rotor rim where, in each case, they open into the space located between the rotor poles.

Further, optionally, the intermediate ring elements each have the shape of a ring shaped segment and have a recess on the outer contour in the region of the grooves for accommodation of the rotor poles and in this region at least partially do not follow the outer contour of annular plates.

Further, optionally, at least part of the intermediate ring elements is designed such that the surface of said intermediate ring elements arranged in the axial direction has a recess.

Further, optionally, the rotor rim includes a brake disc, and wherein brake disc is arranged directly on the end faces of tension bolts and is fastened by screws engaging tension bolts.

Further, optionally, the rotor rim includes a carrier disc and a segmented brake disc, and wherein the carrier disc is arranged directly on the end faces of tension bolts and is fastened by screws engaging in tension bolts, and wherein the segments of brake disc are connected with the carrier disc by screws.

Further, optionally, the annular plates all have the same axial thickness.

Further, optionally, the annular plates have different axial thickness.

Further, optionally, the axially outer annular plates have a greater axial thickness than axially inner annular plates.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
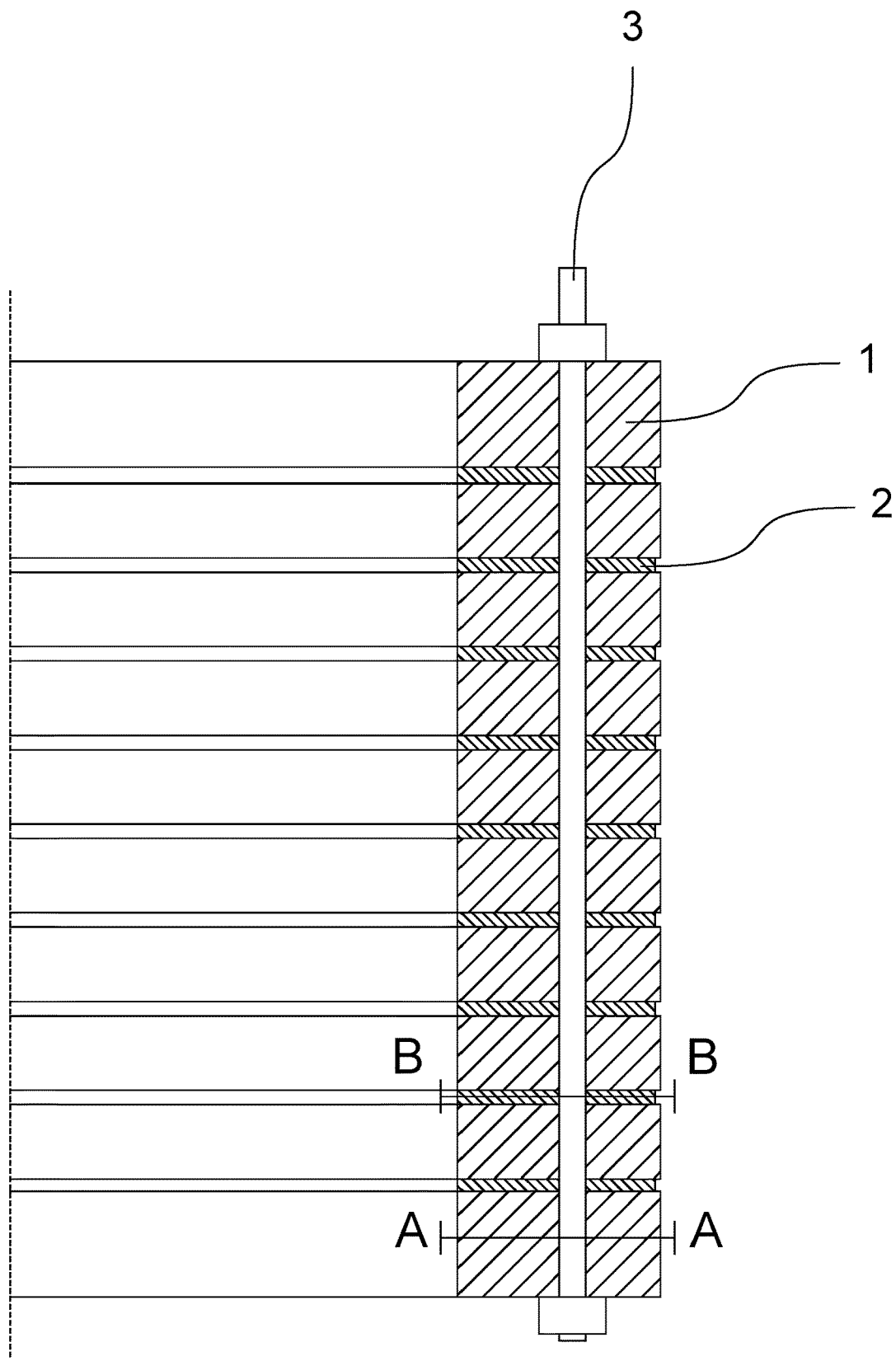
FIG. 1 shows a section parallel to the axis through a rotor rim according to the invention.

FIG. 1 shows a schematic sectional view through a rotor rim according to the present invention. The rotor rim includes at least two solid annular plates, one of which is identified with the number 1. Two of the annular plates 1 are thereby positioned on the outside in axial direction, and any given number (including zero) of annular plates 1 are positioned between the two outer plates. The axis of rotation of the rotor rim is indicated by the dashed line on the left. Annular plates 1 are connected together by a plurality of axially oriented tension bolts, one of which is shown and designated 3.

Figure 2:
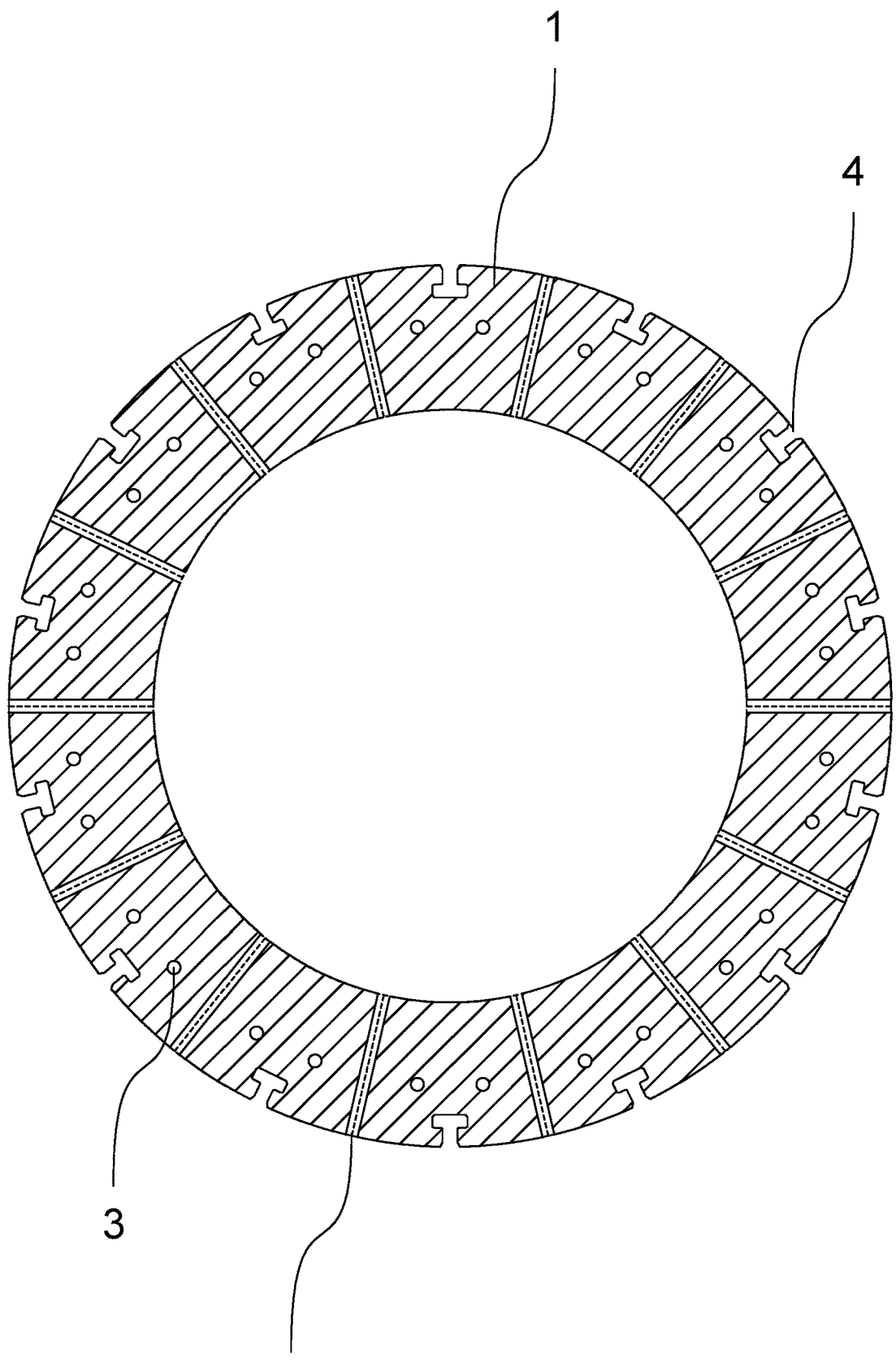
FIG. 2 shows a section perpendicular to the axis of the rotor ring from FIG. 1 along A-A.

FIG. 2 shows a schematic view of a section perpendicular to the axis through the rotor rim of FIG. 1 along line A-A. The drawing shows one of the solid annular plates 1. Arranged on the outer circumference of annular plates 1 are hammerhead-like grooves which serve to accommodate the rotor poles and one of which is designated 4. The grooves may also be shaped differently, for example as dovetails or similar. Also, several such grooves can be provided to accommodate one pole each. The rotor rim shown in FIG. 2 is designed to accommodate 14 rotor poles. However, all even numbers can be considered for the number of rotor poles to be accommodated. In the embodiment shown in FIG. 2, two tension bolts 3 are provided per pole. However, more than two tension bolts (3) per pole can also be provided. In FIG. 2, tension bolts 3 are all arranged on one and the same pitch circle around the axis of rotation of the rotor rim. Tension bolts 3 can also be arranged on several pitch circles with different radii.

FIG. 2 shows optional ventilation holes which extend from the inside of annular plate 1 to the outside of same. One of these ventilation holes is identified by number 5. On the outside, optional ventilation holes 5 open into locations between the poles. In FIG. 2, one ventilation hole 5 is provided between each of two poles, but it could also be more. If several ventilation holes 5 are provided between two poles each, they can be arranged one above the other in the axial direction or adjacent to each other in the plane shown in FIG. 2. Ventilation holes 5 shown in FIG. 2 are oriented in radial direction. They could also be oriented in a different direction, for example, offset parallel relative to a radius. In any case, ventilation holes 5 are arranged in such a way that air can pass from the inside of the rotor rim through ventilation holes 5 into the space between two poles. As stated, ventilation holes 5 are optional. Such ventilation holes 5 may also be located in only some of the annular plate 1, for example only in the two annular plates located on the outside in the axial direction.

Base material to be considered for annular plates 1 can be steel plates or forged steel rings.

Figure 3:
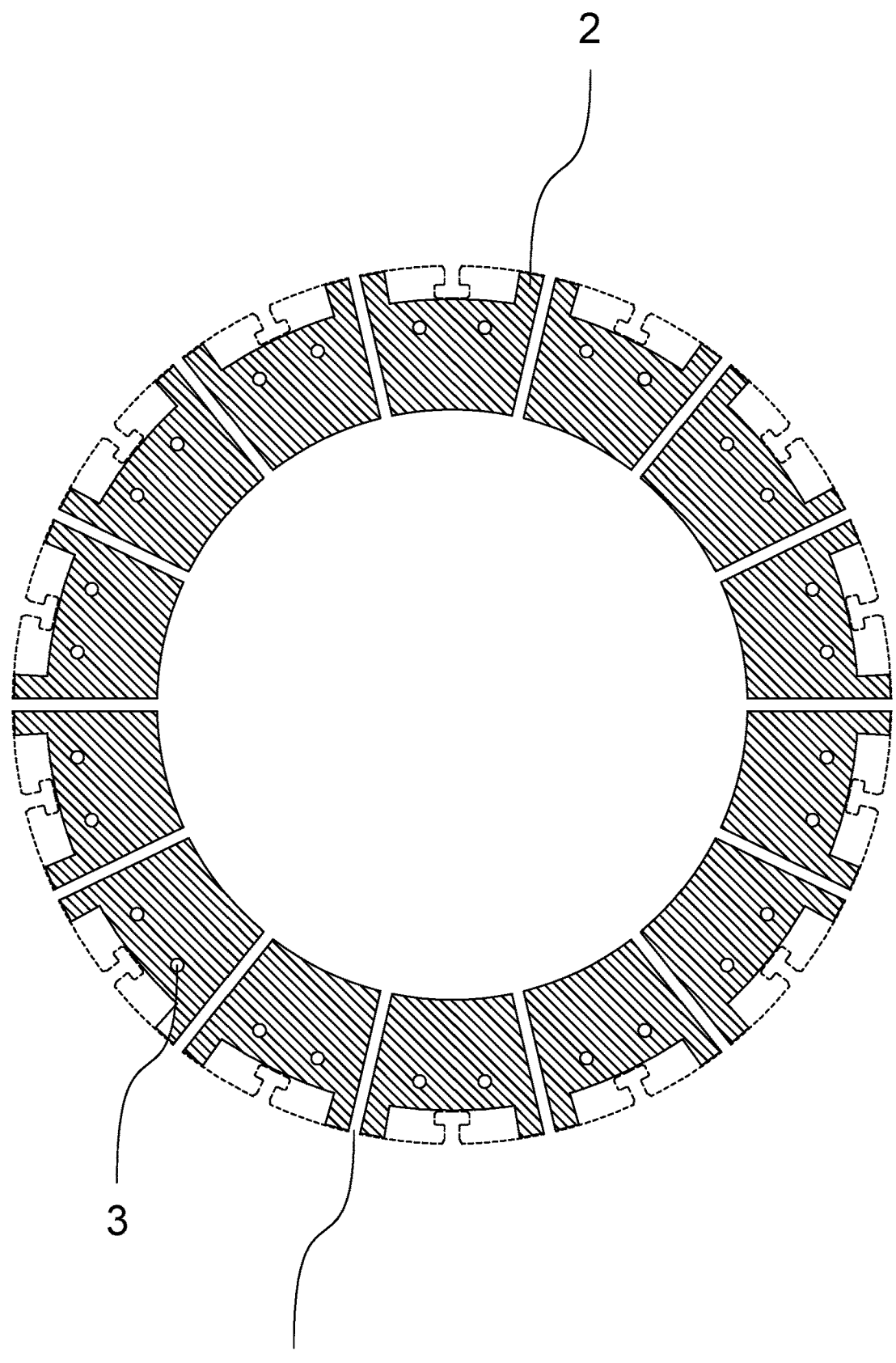
FIG. 3 shows a section perpendicular to the axis of the rotor ring from FIG. 1 along B-B.

FIG. 3 shows a schematic view of a section perpendicular to the axis of rotation through the rotor rim of FIG. 1 along line B-B. As can be seen from the position of line B-B in FIG. 1, the arrangement shown in FIG. 3 is located between two annular plates 1. The arrangement shown in FIG. 3 includes a number of intermediate ring elements, one of which is identified with 2. The arrangement according to FIG. 3 includes exactly one intermediate ring element 2 per pole. To more clearly show the position of intermediate ring elements 2, the outer contour of annular plate 1 is indicated by the dashed line in FIG. 3. Viewed from the outside, one intermediate ring element 2 is thus arranged radially behind the associated pole. The preceding sentence, of course, refers only to one layer of intermediate ring elements 2 as shown in FIG. 3. Since, according to the invention, such a layer of intermediate ring elements 2 is arranged in each case between two adjacent annular plates 1, there are N-1 intermediate ring elements arranged radially behind each pole if, N represents the number of annular plates 1 of which the rotor rim is composed. Each intermediate ring element 2 is penetrated by at least two tension bolts 3. Intermediate ring elements 2 are arranged in such a way that they do not abut each other directly in the tangential direction, but rather leaving an open space. The thus formed spaces represent ventilation ducts, one of which is designated 6.

Intermediate ring elements 2 fulfill a dual function. On the one hand, they represent spaces between each two annular plates 1 adjacent in the axial direction, and on the other hand—with their outer contours aligned laterally to adjacent intermediate ring elements 2—they form the lateral walls of ventilation ducts 6. The axially oriented walls of ventilation ducts 6 are thereby formed by adjacent annular plates 1.

Intermediate ring elements 2 shown in FIG. 3 are substantially in the shape of ring shaped segments. On the radially outer side, they deviate from this shape in that they have a recess in the region of the associated pole, so that the contour of intermediate ring elements 2 in this region does not follow the outer contour of the annular plates. The recesses offer the advantage of easier manufacturability, as the grooves for accommodating the poles do not have to be included in the intermediate ring elements. The recesses moreover result in weight saving. However, intermediate ring elements 2 could also deviate from the shape of ring shaped segments in other ways. For example, the outer contour of intermediate ring elements 2, which form the lateral walls of ventilation ducts 6, could be oriented in such a way that the width of the ventilation ducts decreases from radially inward to radially outward, so that the air flowing through them increases in flow velocity outward. Or said outer contours could deviate from the straight shape, so that the described progression of the lateral walls is additionally curved. Furthermore, the corners of intermediate ring elements 2 could be rounded. Intermediate ring elements 2 may have surfaces on the outer and/or inner diameter to improve the initial assembly.

Figure 4:
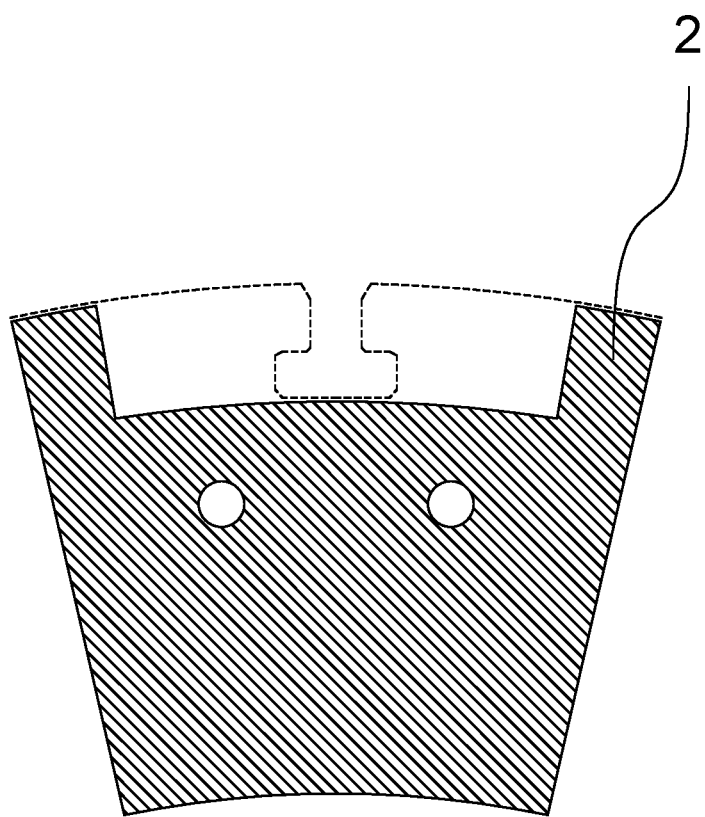
FIG. 4 shows an intermediate ring element in an enlarged view.

FIG. 4 shows an enlarged view of intermediate ring element 2. The design of intermediate ring element 2 shown in FIG. 4 is to be regarded as optional. In regions where it follows the outer contour of the annular plates, intermediate ring element 2 shown is slightly set back from this outer contour, which is represented by dashed lines. The installation position of intermediate ring elements 2 is determined by the alignment of the bores for tension bolts 3 and/or possible machined surfaces on the inner and outer diameters. However, a certain oversize of the corresponding bores is unavoidable so that tension bolts 3 can be inserted without problems. This in turn results in a certain amount of play for the position of intermediate ring elements 2. During installation, these are aligned so that the inner contour of intermediate ring elements 2 is flush with the annular plates. The undersize on the outside prevents intermediate ring elements 2 from protruding beyond the outer contour of the annular plates on the outside if they should be displaced outward by centrifugal force during operation of the electrical machine.

Said undersize must be at least as large as the clearance of the holes in relation to tension bolts 3.

Figure 5A:
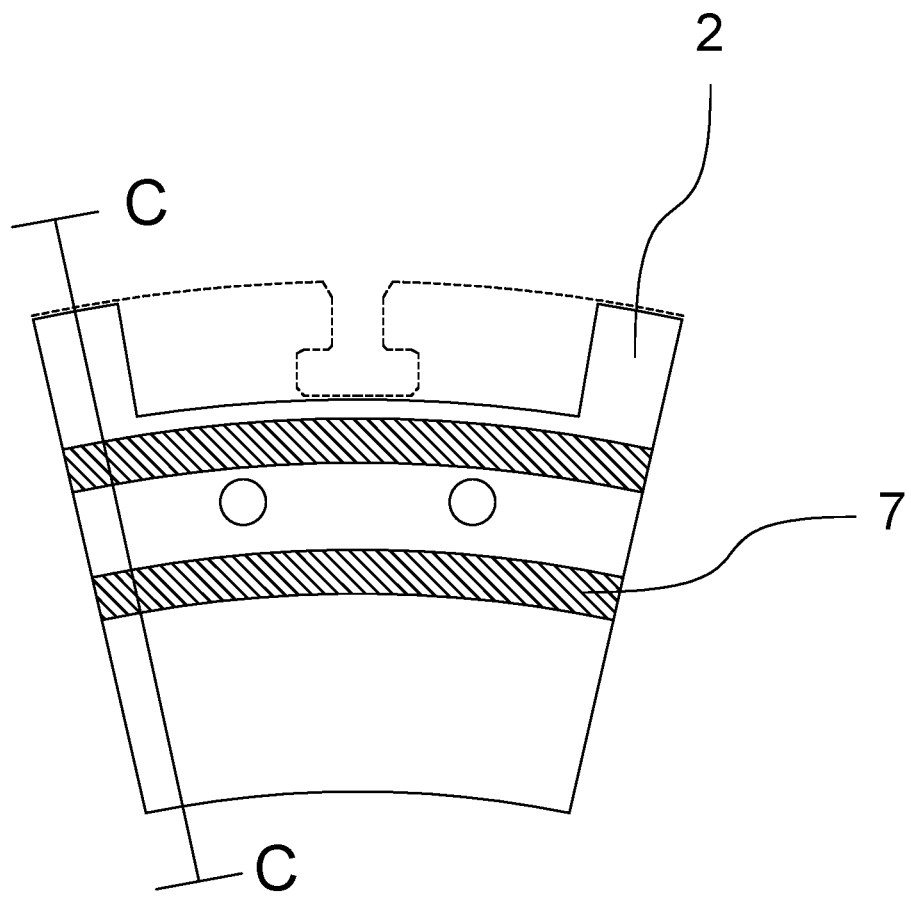
FIG. 5A shows an intermediate ring element in an enlarged view.

FIG. 5A shows a further detail of an intermediate ring element 2 according to the invention. Intermediate ring elements 2 according to the invention rest against adjacent annular plates 1 with only part of their axially oriented surface. In FIG. 5A, the part of the axially oriented surface in contact with annular plates 1 is shown hatched. In the embodiment shown, these are two ring shaped segments, one ringshaped segment being arranged radially outside and the other radially inside the bores for tension bolts 3. The shape of the adjoining segment of the axially oriented surface shown is only one of many possibilities.

Figure 6:
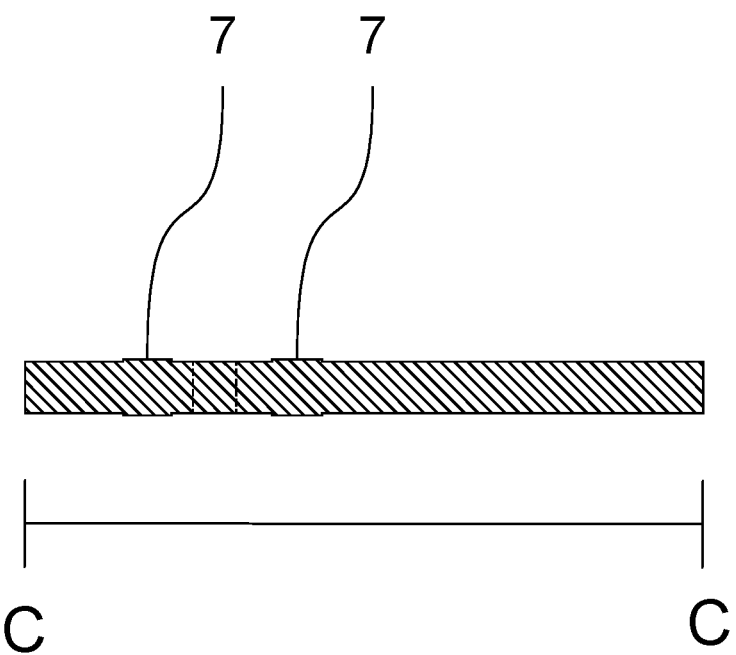
FIG. 6 shows a section through an intermediate ring element along C-C.

FIG. 6 shows a section through intermediate ring element 2 shown in FIG. 5A in a cross-section along the line C-C. From this it is evident that adjoining section 7 is raised in relation to the remaining axially oriented surface of intermediate ring element 2, and that adjoining sections 7 located above and below respective annular plate 1 are positioned opposite each other in the axial direction.

The fact that intermediate ring elements 2 are in contact with adjacent annular plates 1 with only part 7 of their surface has the advantage that only in this part 7 the surface must meet the specified flatness tolerances, while the part of the surface that is not in contact can be manufactured with less precision.

Figure 5B:
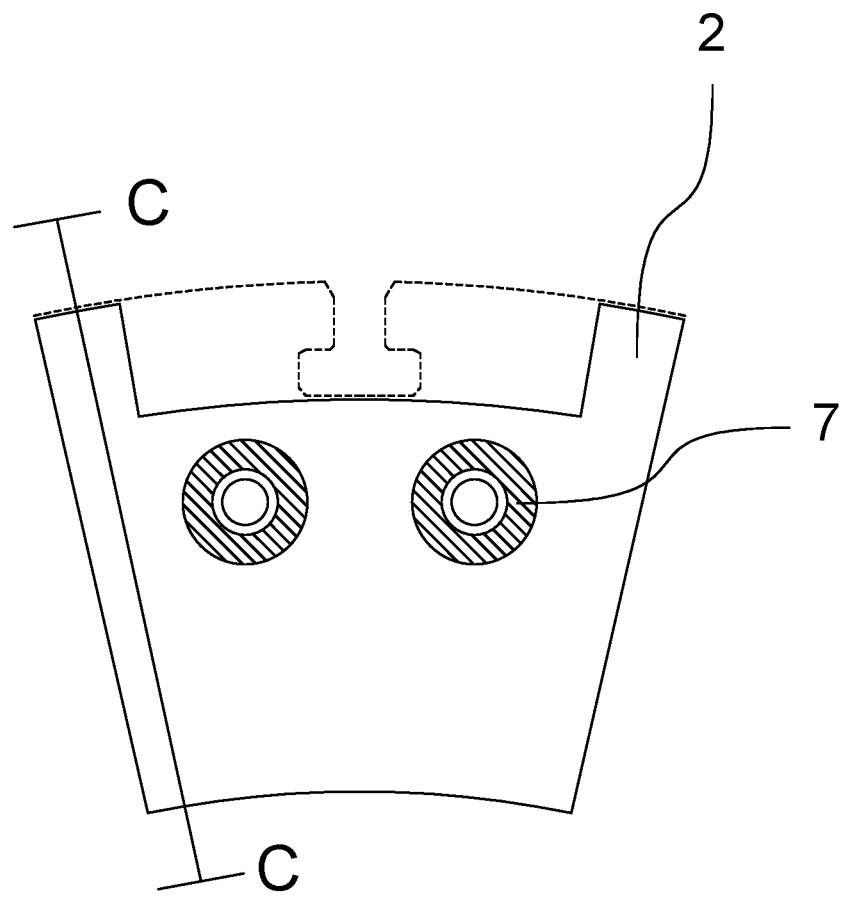
FIG. 5B shows an intermediate ring element in an enlarged view.

Alternative designs of adjoining partial surface 7 to the shape shown in FIGS. 5A and 6 could, for example, consist of several circular, oval, rectangular or otherwise shaped partial surfaces arranged in any number and combination around the holes for tension bolts 3. FIG. 5B shows such an alternative configuration in the form of circular rings extending around the holes.

Figure 7:
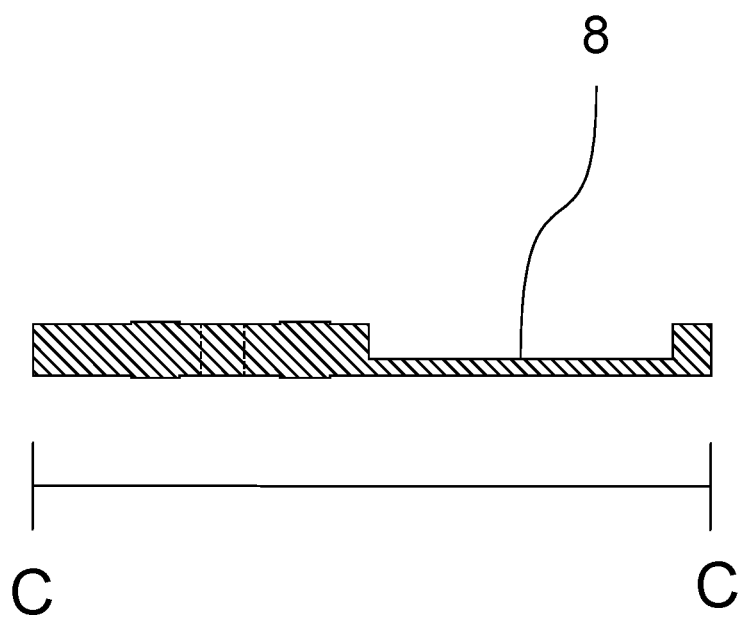
FIG. 7 shows a section through an intermediate ring element along C-C in another embodiment.

FIG. 7 shows another optional feature of an intermediate ring element 2 in the same format of representation as FIG. 6. The surface of intermediate ring element 2 arranged in the axial direction has a recess which is identified with number 8. Recess 8 obviously does not belong to the part of the surface which adjoins neighboring annular plates 1. The advantage of optional recess 8 is weight saving. This advantage is already achieved if only some of the intermediate ring elements 2 feature a recess 8.

Steel or aluminum can be used as the base material for intermediate ring elements 2.

Figure 8:
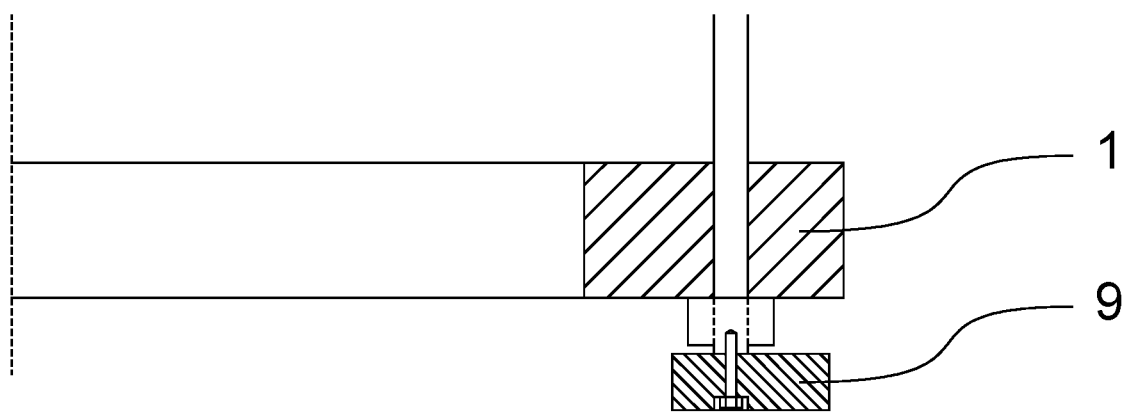
FIG. 8 shows a detail of a rotor rim according to the invention with brake disc.

FIG. 8 shows a detail of a rotor rim according to the invention with a brake disk, which is designated 9. Brake disk 9 is advantageously arranged directly on the end faces of tension bolts 3 and fastened with screws that engage in tension bolts 3. Alternatively, the brake disc can also be attached to the rotor support structure. The embodiment shown is suitable for single-component brake discs. If a segmented brake disc is to be used, a carrier disc can be mounted as shown in FIG. 8, wherein the brake disc segments are then screwed onto the carrier disc with additional screws.

In conclusion, it should be noted that annular plates 1 can all have the same axial thickness, or that the individual annular plates can have different axial thicknesses. For example, in the embodiment shown in FIG. 1, for example, the axially outer annular plates have a greater axial thickness than the inner annular plates. This specific embodiment advantageously allows the attachment of various parts located at the axial ends of the rotor, which are not shown in FIG. 1. In general, it is advantageous if the axial thickness of the annular plates is adapted to the load occurring at the respective location. In other words, the higher the location-specific load, the greater the axial thickness of the annular plates arranged in that location.

COMPONENT IDENTIFICATION LISTING

1 Annular plate
2 intermediate ring element
3 tension bolt
4 groove for accommodation of a rotor pole
5 ventilation bore
6 ventilation duct
7 adjoining surface
8 recess
9 brake disc While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotor rim for an electric machine, the rotor rim comprising:
a plurality of tension bolts which are axially oriented;
at least two annular plates which are solid, two of the at least two annular plates being arranged in an axial direction on an outside so as to form two outer annular plates, which are configured such that any given number of other ones of the annular plates are arranged between the outer annular plates, the plurality of tension bolts connecting the at least two annular plates to one another, the at least two annular plates including an outer circumference which includes a plurality of grooves arranged thereon, the plurality of grooves being configured for accommodating a plurality of rotor poles which are configured such that for each one of the plurality of rotor poles at least two of the plurality of tension bolts are provided;
a plurality of intermediate ring elements, between each two adjacent ones of the at least two annular plates respectively a layer of the plurality of intermediate ring elements being arranged, each layer of the plurality of intermediate ring elements being configured for including exactly one of the plurality of intermediate ring elements per one of the plurality of rotor poles, the plurality of intermediate ring elements being arranged in such a way that between each two adjacent ones of the plurality of intermediate ring elements a ventilation duct is formed which extends from an inside of the rotor rim to an outer circumference of the rotor rim where the ventilation duct opens into a space between the plurality of rotor poles, each of the plurality of intermediate ring elements being penetrated by at least two of the plurality of tension bolts and including an axially oriented surface which includes an abutting part and a remaining part, each of the plurality of intermediate ring elements abutting with only the abutting part of the axially oriented surface against an adjacent one of the at least two annular plates respectively, the abutting part of the axially oriented surface being configured in each case to be raised with respect to the remaining part of the axially oriented surface of a respective one of the plurality of intermediate ring elements.

2. The rotor rim according to claim 1, wherein at least a part of the at least two annular plates has a plurality of ventilation holes which extend from an interior of the rotor rim to the outer circumference of the rotor rim where in each case the plurality of ventilation holes open into the space located between the plurality of rotor poles.

3. The rotor rim according to claim 1, wherein the plurality of intermediate ring elements each has a shape of a ring-shaped segment and has a recess on an outer contour in a region of the plurality of grooves configured for accommodation of the plurality of rotor poles, and in the region the plurality of intermediate ring elements at least partially do not follow an outer contour of the at least two annular plates.

4. The rotor rim according to claim 1, wherein at least a part of the plurality of intermediate ring elements is configured such that the axially oriented surface of the plurality of intermediate ring elements respectively has a recess.

5. The rotor rim according to claim 1, wherein the at least two annular plates all have a same axial thickness.

6. The rotor rim according to claim 1, wherein the at least two annular plates have different axial thickness relative to one another.

7. The rotor rim according to claim 1, wherein the at least two annular plates further include a plurality of axially inner annular plates, wherein the outer annular plates have a greater axial thickness than the plurality of axially inner annular plates.

* * * * *